(12) United States Patent
Fu

(10) Patent No.: US 12,203,521 B2
(45) Date of Patent: Jan. 21, 2025

(54) DAMPER DEVICES, MACHINE TOOLS AND METHOD OF ASSEMBLING DAMPER DEVICE

(71) Applicant: MAQ AB, Saltsjö-Boo (SE)

(72) Inventor: Qilin Fu, Solna (SE)

(73) Assignee: MAQ AB, Saltsjö-Boo (SE)

( * ) Notice: Subject to any disclaimer, the term of this patent is extended or adjusted under 35 U.S.C. 154(b) by 0 days.

(21) Appl. No.: 18/282,674

(22) PCT Filed: Mar. 30, 2021

(86) PCT No.: PCT/EP2021/058263
§ 371 (c)(1),
(2) Date: Sep. 18, 2023

(87) PCT Pub. No.: WO2022/207076
PCT Pub. Date: Oct. 6, 2022

(65) Prior Publication Data
US 2024/0035543 A1    Feb. 1, 2024

(51) Int. Cl.
*F16F 13/04*        (2006.01)
*B23C 5/00*         (2006.01)
*F16F 15/02*        (2006.01)

(52) U.S. Cl.
CPC .............. *F16F 13/04* (2013.01); *B23C 5/003* (2013.01); *F16F 15/022* (2013.01);
(Continued)

(58) Field of Classification Search
CPC ...... F16F 13/04; F16F 15/022; F16F 2222/08; F16F 2234/02; F16F 2226/04; F16F 2228/007; F16F 2234/04; B23C 5/003
(Continued)

(56) References Cited

U.S. PATENT DOCUMENTS 3,207,009 A * 9/1965 Carlstedt ............ B23Q 17/0976
188/380
3,559,512 A * 2/1971 Aggarwal ................ F16F 7/10
188/322.5
(Continued)

FOREIGN PATENT DOCUMENTS

CN    107962218 A    4/2018
JP    2007290047 A    11/2007
(Continued)

OTHER PUBLICATIONS

PCT International Search Report and Written Opinion dated Nov. 26, 2021 for International Application No. PCT/EP2021/058263, 11 pages.
(Continued)

*Primary Examiner* — Xuan Lan Nguyen
(74) *Attorney, Agent, or Firm* — RMCK Law Group, PLC

(57) ABSTRACT

A damper device for a machine tool, the damper device comprising a tubular element having a cavity and a central axis, the tubular element comprising a first surface; a damping mass arranged within the cavity and movable radially with respect to the central axis and relative to the tubular element; at least one spring element supporting the damping mass relative to the tubular element, the damping mass and the at least one spring element being arranged to attenuate kinetic vibration energy of the damper device; at least one fixed part having a fixed interior portion inside the cavity and a second surface; and a vibration damping material provided between the first surface and the second surface, the vibration damping material being arranged to attenuate potential vibration energy of the damper device; wherein the vibration damping material is substantially evenly compressed between the first surface and the second surface.

22 Claims, 16 Drawing Sheets

(52) U.S. Cl.
CPC ....... *F16F 2222/08* (2013.01); *F16F 2226/04* (2013.01); *F16F 2228/007* (2013.01); *F16F 2234/02* (2013.01); *F16F 2234/04* (2013.01)

(58) Field of Classification Search
USPC ........................................................ 188/378
See application file for complete search history.

(56) References Cited

U.S. PATENT DOCUMENTS

| | | | | |
|---|---|---|---|---|
| 3,690,414 | A | * | 9/1972 | Aggarwal ......... B23Q 11/0032 |
| | | | | 408/143 |
| 4,616,738 | A | | 10/1986 | Shurtliff |
| 5,975,070 | A | * | 11/1999 | Sands .................. F41B 5/1426 |
| | | | | 267/136 |
| 10,113,608 | B2 | * | 10/2018 | Freyermuth ............ B23C 5/003 |
| 2020/0147698 | A1 | | 5/2020 | Buck |

FOREIGN PATENT DOCUMENTS

| | | |
|---|---|---|
| JP | 2015188982 A | 11/2015 |
| WO | 2018044216 A1 | 3/2018 |
| WO | 2019168448 A1 | 9/2019 |
| WO | 2020049167 A1 | 3/2020 |
| WO | 2020050756 A1 | 3/2020 |

OTHER PUBLICATIONS

Canadian Office Action and Examination Report dated Oct. 24, 2023 for Canadian Patent Application No. 3,207,559, 6 pages.

\* cited by examiner

DAMPER DEVICES, MACHINE TOOLS AND METHOD OF ASSEMBLING DAMPER DEVICE

CROSS-REFERENCE TO RELATED APPLICATIONS

This application is a 371 U.S. National Stage of International Application No. PCT/EP2021/058263, filed Mar. 30, 2021. The disclosure of the above application is incorporated herein by reference in its entirety.

TECHNICAL FIELD

The present disclosure generally relates to damper devices for machining operations. In particular, a damper device for a machine tool, a machine tool comprising such damper device, a method of assembling a damper device for a machine tool, a damper device assembled according to the method, and a machine tool comprising such damper device, are provided.

BACKGROUND

A machine tool may be used in various machining processes, such as milling, turning, boring, grinding and drilling processes. The machine tool may comprise one or more cutting teeth and a tool holder holding the cutting teeth. Machining vibrations, also called chatter, occur naturally during machining operations and correspond to the relative movement between the workpiece and the machine tool. Machine tools often use the material removal rate as a key performance indicator. A high material removal rate requires high speed, high depth of cut and high feed rate. All of the three parameters will tend to increase the vibrations in the machine tool during a machining process. Vibrations of the machine tool however deteriorate the surface quality of the machined workpiece, limit productivity and increase production costs.

In order to damp vibrations in the machine tool, the machine tool may comprise a tuned mass damper assembly comprising a damping mass. By tuning the vibrational eigenfrequency of the mass damper assembly to match the vibrational frequency of the machine tool, kinetic vibration energy is transferred to the damping mass to stabilize movements of the machine tool. A matching of the two frequencies is usually obtained by tuning the eigenfrequency of the mass damper assembly by manually fine adjusting a supporting stiffness of the damping mass. A manual tuning step of a mass damper assembly is intricate and requires knowledge in structure vibration analysis. For this reason, pre-tuned mass dampers having a viscous fluid inside are commonly used. A machine tool having a pre-tuned mass damper functions well at its targeted frequency range, which is normally determined by its diameter, its overhang, and the rigidity of the tool clamping.

WO 2018044216 A1 and WO 2019168448 A1 each discloses a machine tool having a mass damper assembly with spring elements and a damping mass. The spring elements comprise a material having a frequency dependent elastic modulus to provide a self-tuning effect. The self-tuning effect substantially increases an operational frequency range of the mass damper assembly.

SUMMARY

One object of the present disclosure is to provide a damper device for a machine tool, which damper device has an improved performance.

A further object of the present disclosure is to provide a damper device for a machine tool, which damper device improves surface finish capability of the machine tool.

A still further object of the present disclosure is to provide a damper device for a machine tool, which damper device has an improved vibrational damping.

A still further object of the present disclosure is to provide a damper device for a machine tool, which damper device has an improved vibrational damping over a wider vibrational frequency range.

A still further object of the present disclosure is to provide a damper device for a machine tool, which damper device has a cost-efficient, reliable and/or less complicated design.

A still further object of the present disclosure is to provide a damper device for a machine tool, which damper device enables a cost-efficient, reliable and/or less complicated assembly.

A still further object of the present disclosure is to provide a damper device for a machine tool, which damper device has a high rigidity.

A still further object of the present disclosure is to provide a damper device for a machine tool, which damper device has a long lifetime.

A still further object of the present disclosure is to provide a damper device for a machine tool, which damper device solves several or all of the foregoing objects in combination.

A still further object of the present disclosure is to provide a machine tool comprising a damper device, which machine tool solves one, several or all of the foregoing objects.

A still further object of the present disclosure is to provide a method of assembling a damper device for a machine tool, which method solves one, several or all of the foregoing objects.

A still further object of the present disclosure is to provide a method of assembling a damper device for a machine tool, which method is cost-efficient, reliable and/or less complicated.

A still further object of the present disclosure is to provide a method of assembling a damper device for a machine tool, which method can be carried out fast.

According to a first aspect, there is provided a damper device for a machine tool, the damper device comprising a tubular element having a cavity and a central axis, the tubular element comprising a first surface; a damping mass arranged within the cavity and movable radially with respect to the central axis and relative to the tubular element; at least one spring element supporting the damping mass relative to the tubular element, the damping mass and the at least one spring element being arranged to attenuate kinetic vibration energy of the damper device; at least one fixed part having a fixed interior portion inside the cavity and a second surface; and a vibration damping material provided between the first surface and the second surface, the vibration damping material being arranged to attenuate potential vibration energy of the damper device; wherein the vibration damping material is substantially evenly compressed, or evenly compressed, between the first surface and the second surface.

When cutting forces are applied to cutting teeth supported by the damper device, vibrations are excited in the damper device. The vibration energy carried by vibration waves will then transfer between kinetic vibration energy and potential vibration energy inside the machine tool. When the kinetic vibration energy is the highest, the potential vibration energy is the lowest and vice versa since the sum of the kinetic vibration energy and the potential vibration energy is substantially constant (if not attenuated). When a vibration wave reaches the vibration damping material, the vibration wave is attenuated by the vibration damping material and reflected by, and/or transmitted through, the vibration damping material. When a vibration wave reaches the damping mass, the vibration wave is attenuated and reflected by the damping mass. The process continues until the vibration waves are completely attenuated.

The damping mass supported by the at least one spring element will attenuate the kinetic vibration energy and the vibration damping material will attenuate the potential vibration energy. The damper device will thereby attenuate the vibration energy sequentially. The vibration damping material may be both sheared and further compressed to attenuate potential vibration energy.

Moreover, the damper device will vibrate at multiple frequencies during machining. A further advantage with the damper device is that the vibration damping material will attenuate vibrations also at frequencies outside a nominal range of the mass damper assembly.

By means of the vibration damping material, the vibration damping capacity of the damper device is substantially improved. As a consequence, the machining performance of the damper device is also substantially improved.

The damper device comprises a mass damper assembly and a structure damper assembly. The mass damper assembly comprises the damping mass and the at least one spring element. The structure damper assembly comprises the vibration damping material. The structure damper assembly may further comprise the first surface and the second surface. The structure damper assembly thus constitutes an additional vibration attenuation source in addition to the mass damper assembly. Each of the mass damper assembly and the structure damper assembly may be assembled on one or more of the at least one fixed part.

The compression of the vibration damping material prior to use of the damper device locks the shape of the vibration damping material. Since the vibration damping material is compressed between the first surface and the second surface, twisting of the vibration damping material resulting in damages can be avoided. The vibration damping material may be compressed at least 3%, such as at least 5%, such as at least 10% in a radial direction with respect to the central axis from an uncompressed state during assembly.

The vibration damping material may be distributed symmetrically with respect to the central axis. For example, the vibration damping material may surround either the first surface or the second surface. The compression of the vibration damping material will assist the at least one fixed part to be centered with respect to the central axis.

The vibration damping material may extend along the central axis. For example, a length of the vibration damping material along the central axis may be at least half of a length of the damping mass along the central axis, such as larger than the length of the damping mass along the central axis.

The first surface and the second surface may have substantially corresponding shapes, or corresponding shapes. The vibration damping material may be provided as a layer between the first surface and the second surface. The first surface may or may not be in contact with the second surface.

The fixed interior portion may be fitted into the cavity by means of a transition fit or an interference fit. In this way, the bending area of moment can be maintained when the fixed interior portion is inserted into the cavity despite introducing the structure damper assembly. The introduction of the structure damper assembly thereby has a minimum impact on the static stiffness of the damper device when the damper device is clamped in a tool fixture.

Throughout the present disclosure, the damper device may be a tool holder or a tool. A tool may differ from a tool holder in that the tool comprises one or more cutting teeth while the tool holder does not.

The damper device can be used in various machining operations, such as milling, turning, boring, grinding and drilling operations. The damper device may be configured to hold or support one or more cutting teeth for machining a workpiece. In this case, the cutting teeth may be detachably connected to the damper device or may be integrally formed with the damper device. The damper device may for example be a tool holder that supports a further tool holder which in turn holds the cutting teeth.

The damper device may comprise an end effector. The mass damper assembly may be arranged between the end effector and the structure damper assembly. The end effector is provided at a front end of the damper device. The damper device thus also comprises a rear end, opposite to the front end.

The tubular element and the at least one fixed part may be made of the same material. Examples of suitable materials include steel, tungsten alloy and tungsten carbide. The tubular element may comprise a cylindrical exterior surface and/or a cylindrical interior surface.

The damper device may further comprise a back end. In this case, each of the at least one fixed part is fixed, directly or indirectly, to the back end. Throughout the present disclosure, the fixed part may alternatively be referred to as a locked part.

The damping mass may be supported on one or both sides with one or more spring elements. The damping mass may for example be supported by only one spring element on one side and by only one spring element on an opposite side. Alternatively, the damping mass may be supported by a plurality of spring elements on one side and by a plurality of spring elements on an opposite side. Alternatively, the damping mass may be supported by only one or by several spring elements on one side and may be unsupported on an opposite side.

Each spring element may be configured to convert vibration energy into heat. Each spring element may be an elastic element. Each spring element may have a frequency dependent elastic modulus. In this way, a self-tuning effect can be obtained. For example, the spring element may have a frequency dependent elastic modulus such that a resonance frequency of the damping mass substantially matches, or matches, a vibration frequency of the damper device over a vibration frequency range from 100 Hz to 1000 Hz, such as from 20 Hz to 3000 Hz. Materials with such frequency dependent stiffness may have a structural size of 100 nm or less in at least one dimension.

As an alternative to a material having such frequency dependent elastic modulus, the at least one spring element may be made of rubber or elastomer. Rubbers and elastomers typically have a damping ratio below 10%.

The first surface and the second surface may be tapered. By means of the tapered design of the first surface and the second surface, the damper device provides a self-locking effect when the vibration damping material is compressed. With self-locking effect is meant that the force exerted by the vibration damping material on the first surface and the second surface due to its compression does not cause separation between the first surface and the second surface.

The tapered design of the first surface and the second surface also enables a high degree of precompression of the vibration damping material. In this way, at least 95% of the surface areas, such as nearly 100% of the surface areas, of the vibration damping material can be in contact with the first surface and the second surface. This in turn enables a high capability of the damper device to transmit vibrational waves through the vibration damping material to efficiently attenuate potential vibration energy. Furthermore, the tapered design in combination with the compression of the vibration damping material enable avoidance of any clearance between the vibration damping material and the first surface and/or the second surface, and avoidance that the vibration damping material is smeared away by friction resistance.

The first surface and the second surface may be rotationally symmetric with respect to the central axis. For example, each of the first surface and the second surface may be cone-shaped. As possible alternatives, tapered shapes may include convex or concave shapes of the first surface and the second surface.

In case the first surface is provided outside the second surface, the front end of the taper may be smaller than the rear end of the taper. That is, the tapered design may be configured such that a front end of the first surface and the second surface, respectively, spans a smaller area than a rear end of the first surface and the second surface, respectively. Conversely, in case the first surface is provided inside the second surface, the front end of the taper may be larger than the rear end of the taper. The tapered shapes of the first surface and the second surface make the damper device very easy to assemble.

The first surface and/or the second surface may have an average inclination of at least 0.2 degrees, such as at least 0.5 degrees, such as at least 1 degree, such as 1.5 degrees, with respect to the central axis. Alternatively, or in addition, the first surface and the second surface may have an average inclination of less than 30 degrees, such as less than 10 degrees, such as less than 5 degrees, with respect to the central axis.

The at least one fixed part may be assembled by relative movement between the tubular element and the at least one fixed part along the central axis such that the vibration damping material is substantially evenly compressed, or evenly compressed, between the first surface and the second surface.

At least one of the one or more fixed parts may be inserted into the cavity when assembling the damper device. This at least one fixed part may be inserted into the cavity from a rear end of the tubular element. Alternatively, or in addition, the mass damper assembly may be inserted into the cavity from the rear end of the tubular element. The insertion of the at least one fixed part and the mass damper assembly into the tubular element does not substantially affect the geometric accuracy of the cutting teeth held by the tubular element. By sliding the at least one fixed part into the cavity, a uniform precompression will be applied to the vibration damping material without distorting, smearing and damaging the vibration damping material. The design of the damper device enables precompression to be developed simultaneously and uniformly all over one or more surface areas of the vibration damping material.

The tubular element may be formed as a single piece prior to compressing the vibration damping material between the first surface and the second surface.

In this way, the rigidity of the tubular element is high. As a consequence, the geometric accuracy of the damper device is high.

As a possible alternative, the tubular element may be formed in two halves (e.g. separated in a plane comprising the central axis). In this case, the mass damper assembly, the vibration damping material and one or more of the at least one fixed part may be inserted radially into a first half. The second half may then be connected to the first half to close the tubular element and to thereby evenly compress the vibration damping material. In this variant, the first surface and the second surface do not need to be tapered.

The vibration damping material may comprise a viscoelastic material. Such viscoelastic material is in the solid phase but can easily be deformed and distorted by friction or adhesion. The viscoelastic material may be a polymeric material. Alternatively, or in addition, the viscoelastic material may be a pressure sensitive adhesive. One example of a vibration damping material is acrylic resin polymer.

The cavity may comprise a cylindrical cavity portion. In this case, the damping mass may be arranged within the cylindrical cavity portion. Moreover, at least a portion of one or more of the at least one fixed part may be arranged within the cylindrical cavity portion.

The cavity may comprise a tapered cavity portion defining the first surface. Alternatively, the first surface may be a tapered external surface of the tubular element.

The at least one fixed part may comprise at least two fixed parts fixed with respect to each other. Each of the at least two fixed parts may be fixed to a back end of the damper device or of the machine tool.

The fixed interior portion may comprise a fixed cylindrical portion. In this case, the fixed cylindrical portion may be fitted into the cylindrical cavity portion by a transition fit or an interference fit. The fixed cylindrical portion and the cylindrical cavity portion may however comprise irregularities to improve the fit therebetween and/or to improve alignment between the at least one fixed part and the tubular element. For example, the fixed cylindrical portion and the cylindrical cavity portion may comprise a recess and a corresponding groove. Alternatively, or in addition, the fixed cylindrical portion and the cylindrical cavity portion may have corresponding slightly oval cross-sectional shapes.

One or more of the at least one spring element may be connected to the fixed interior portion. Thus, the damper device may comprise at least one spring element between the damping mass and the fixed interior portion.

The second surface may be inserted into the cavity. Alternatively, the second surface may surround the tubular element.

The at least one fixed part may comprise a mandrel. In this case, each of the mass damper assembly and the structure damper assembly may be assembled on the mandrel.

The vibration damping material may have a damping ratio of at least 10%, such as at least 20%, such as at least 30%. Most metals have a damping ratio of 0% to 0.1%. Rubber may have a damping ratio of 5% to 7.5%. A loss factor can be defined as twice the damping ratio. Thus, the vibration damping material may have corresponding ratios of at least 20%, such as at least 40%, such as at least 60%. The vibration damping material does not need to have a frequency dependent elastic modulus as described for the at least one spring element.

The first surface and the second surface may be conical. Alternatively, or in addition, the first surface and the second surface may be parallel.

The vibration damping material may have a thickness of less than 1 mm, such as less than 0.5 mm, such as less than 0.2 mm, such as 0.1 mm.

The vibration damping material has a Poisson's ratio of at least 0.35, such as at least 0.4, such as at least 0.45. The vibration damping material may have a bulk modulus that is 1.1 times to 16.7 times, such as 3.3 times, its Young's modulus. Alternatively, or in addition, the vibration damping material may have a bulk modulus that is 3 times to 49.7 times, such as 9.7 times, its shear modulus.

According to a second aspect, there is provided a machine tool comprising a damper device according to the first aspect. The machine tool may be configured to machine a workpiece. The machine tool may for example be a milling tool, a turning tool, a boring tool, a grinding tool or a drilling tool.

According to a third aspect, there is provided a method of assembling a damper device for a machine tool, the method comprising providing a tubular element having a cavity and a central axis, the tubular element comprising a first surface; providing a damping mass arranged within the cavity and movable radially with respect to the central axis and relative to the tubular element; providing at least one spring element supporting the damping mass relative to the tubular element, the damping mass and the at least one spring element being arranged to attenuate kinetic vibration energy of the damper device; providing at least one fixed part having a fixed interior portion inside the cavity and a second surface; providing a vibration damping material between the first surface and the second surface, the vibration damping material being arranged to attenuate potential vibration energy of the damper device; and positioning the first surface and the second surface relative to each other such that the vibration damping material is substantially evenly compressed, or evenly compressed, between the first surface and the second surface.

The first surface and the second surface may be tapered. In this case, the method may further comprise moving the tubular element and the at least one fixed part relative to each other along the central axis such that the vibration damping material is substantially evenly compressed, or evenly compressed, between the first surface and the second surface.

According to a fourth aspect, there is provided a damper device assembled according to the method of the third aspect. The damper device according to the fourth aspect may be of any type according to the first aspect.

According to a fifth aspect, there is provided a machine tool comprising a damper device according to the fourth aspect. The machine tool according to the fifth aspect may be of any type according to the second aspect.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
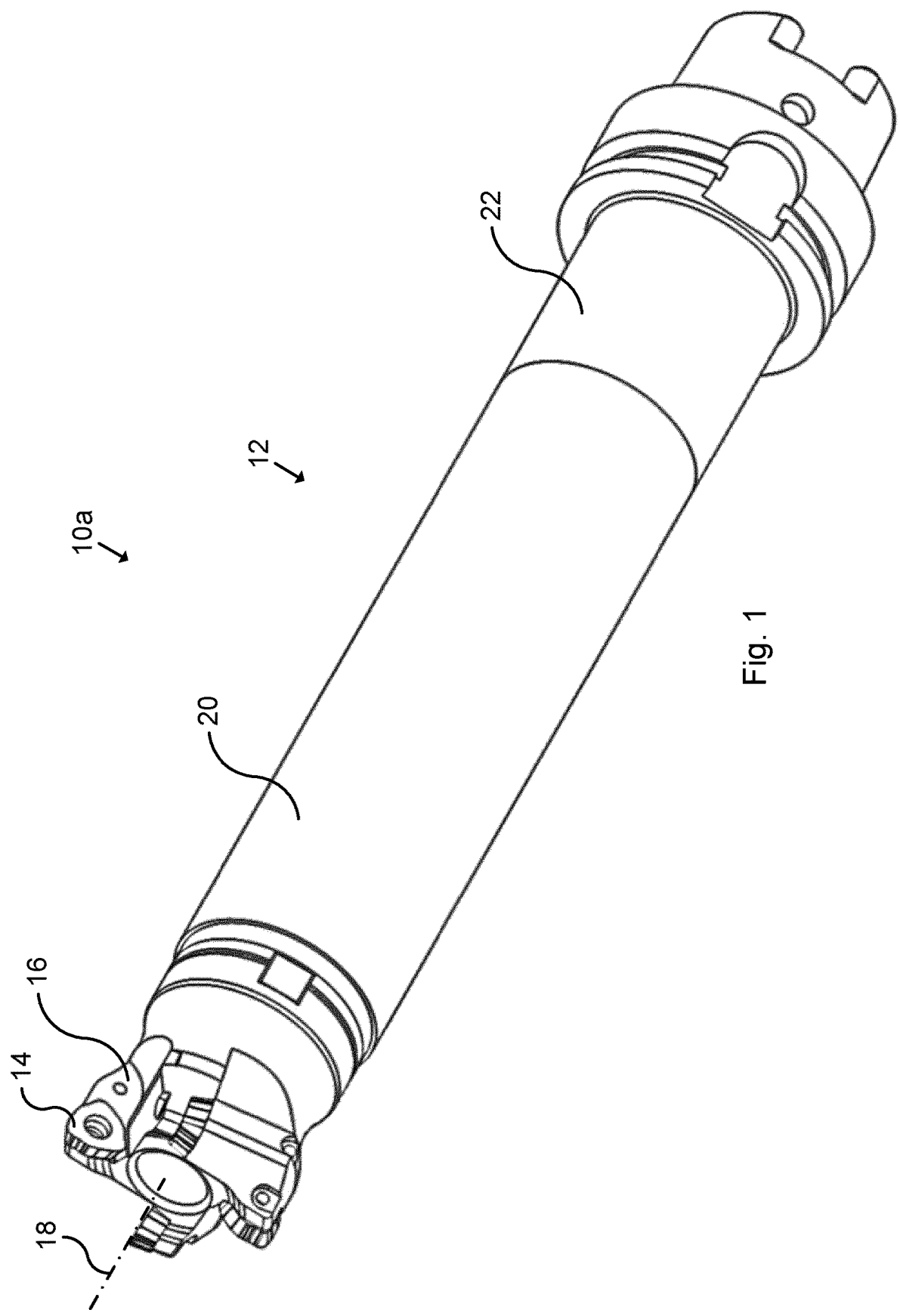
FIG. 1: schematically represents a perspective side view of a machine tool comprising a damper device.

In the following, a damper device for a machine tool, a machine tool comprising such damper device, a method of assembling a damper device for a machine tool, a damper device assembled according to the method, and a machine tool comprising such damper device, will be described. The same or similar reference numerals will be used to denote the same or similar structural features.

FIG. 1 schematically represents a perspective side view of a machine tool 10*a*, here exemplified as a milling tool. The machine tool 10*a* comprises a tool holder 12 and a plurality of cutting teeth 14 for machining a workpiece (not shown). The tool holder 12 is one example of a damper device according to the present disclosure. The machine tool b0a of this example comprises four cutting teeth 14.

The tool holder 12 comprises an end effector 16, here exemplified as a milling head. The end effector 16 is provided at a front end of the tool holder 12. The cutting teeth 14 are connected to the end effector 16. FIG. 1 further shows a central axis 18 of the machine tool 10*a*.

The tool holder 12 further comprises a tubular element 20. The tubular element 20 is concentric with the central axis 18. In this example, the end effector 16 is connected to the tubular element 20.

The tool holder 12 further comprises a back end 22. In operation of the machine tool 10*a*, the back end 22 is fixedly clamped in a tool fixture, such as a rotatable spindle of a machine (not illustrated). During machining of a workpiece, there is a relative movement between the machine tool 10*a* and the workpiece, such as a relative rotation about the central axis 18. Thus, the machine tool 10*a* may move and the workpiece may be stationary, or vice versa.

Figure 2:
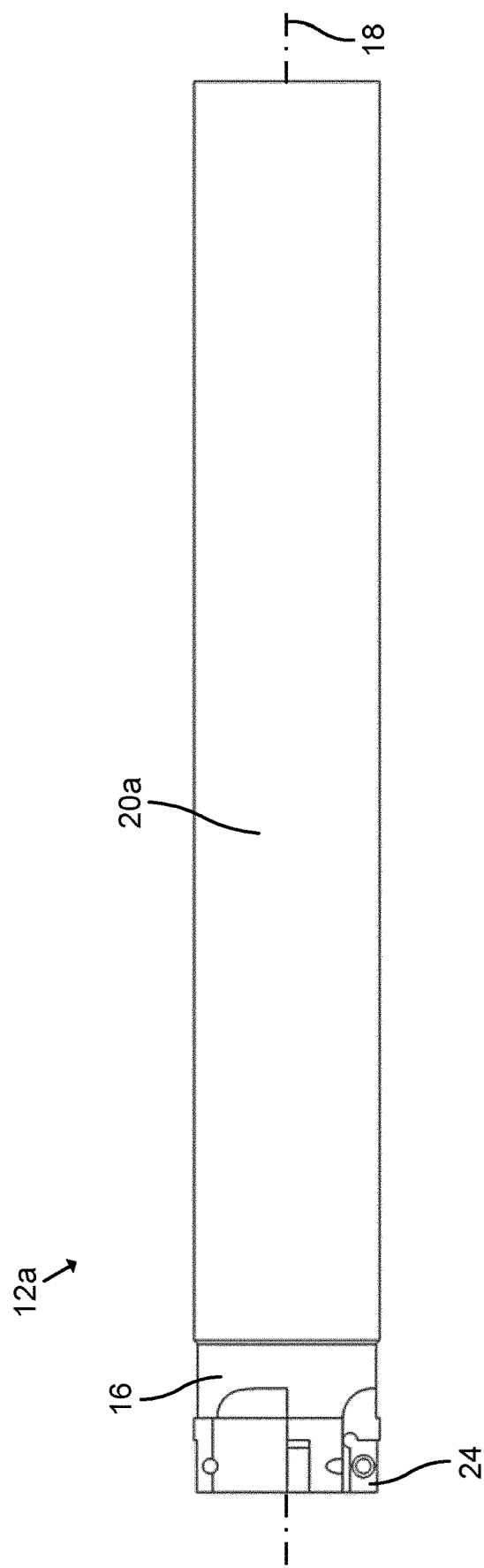
FIG. 2: schematically represents a side view of a further example of a damper device.

FIG. 2 schematically represents a side view of a further example of a tool holder 12*a*. The tool holder 12*a* is one example of a damper device according to the present disclosure. The tool holder 12*a* may replace the tool holder 12 in FIG. 1. The tool holder 12*a* comprises a tubular element 20*a*. The tool holder 12*a* differs from the tool holder 12 in that the end effector 16 is integrally formed with the tubular element 20*a*. FIG. 2 further shows one of several seats 24 to which the cutting teeth 14 can be connected.

Figure 3:
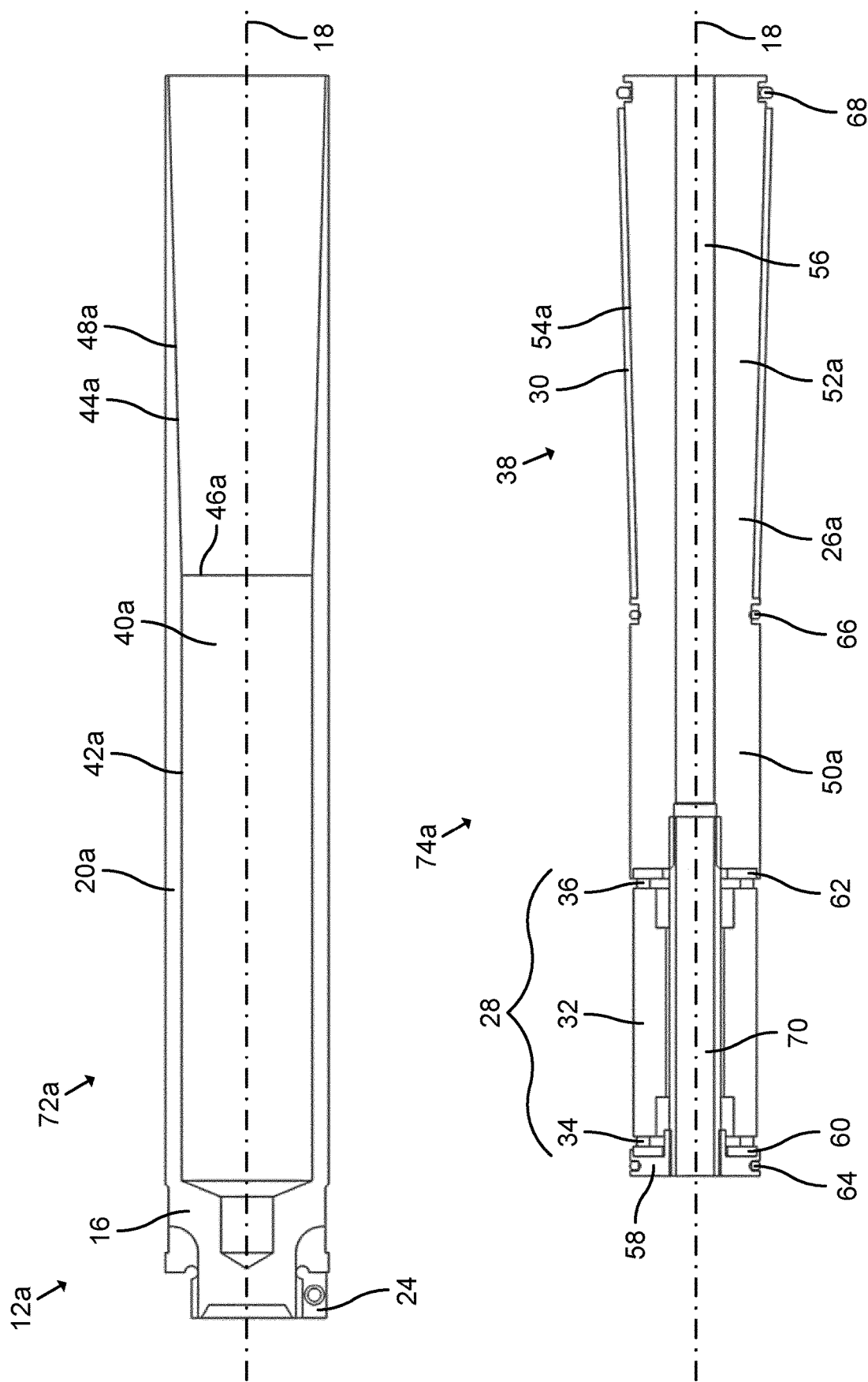
FIG. 3: schematically represents a cross-sectional side view of the damper device in FIG. 2 in an unassembled state.

FIG. 3 schematically represents a cross-sectional side view of the tool holder 12a in FIG. 2 in an unassembled state. In addition to the tubular element 20a, the tool holder 12a further comprises a fixed part 26a, a mass damper assembly 28 and a vibration damping material 30. The tubular element 20a and the fixed part 26a may be made of the same material, such as steel, tungsten alloy or tungsten carbide.

The mass damper assembly 28 of this example comprises a damping mass 32 and one spring element 34 and 36 on each side of the damping mass 32. The tool holder 12a further comprises a structure damper assembly 38 which in turn comprises the vibration damping material 30. The mass damper assembly 28 is here provided between the end effector 16 and the structure damper assembly 38. Each of the mass damper assembly 28 and the vibration damping material 30 are here arranged on the fixed part 26a.

The tubular element 20a comprises a cavity 40a. The cavity 40a is open at a rear end and is closed by the end effector 16 at a front end. The cavity 40a of this example comprises a cylindrical cavity portion 42a and a tapered cavity portion 44a, here exemplified as a conical cavity portion. The cylindrical cavity portion 42a and the tapered cavity portion 44a meet at an edge 46a. The cylindrical cavity portion 42a extends a longer distance along the central axis 18 than the tapered cavity portion 44a, here approximately 20% longer. The interior surface of the tapered cavity portion 44a forms one example of a first surface 48a according to the present disclosure. A diameter of the first surface 48a is smaller at the edge 46a than at the rear end.

The tubular element 20a of this example has a constant exterior diameter. Moreover, the tubular element 20a is formed in a single piece. The tool holder 12a having a tubular element 20a formed in a single piece enables a runout of the cutting teeth 14 of less than 10 μm with respect to a clamping region of the tool holder 12a, such as in a back end 22 of the tool holder 12a.

The fixed part 26a is here exemplified as a mandrel. The fixed part 26a comprises a fixed interior portion 50a and a fixed tapered portion 52a. In this example, the fixed interior portion 50a is cylindrical and the fixed tapered portion 52a is conical. The exterior surface of the fixed tapered portion 52a forms one example of a second surface 54a according to the present disclosure. The first surface 48a and the second surface 54a have corresponding conical shapes. In this example, each of the first surface 48a and the second surface 54a is inclined 1.5 degrees to the central axis 18. The fixed part 26a further comprises a central bore 56 extending therethrough along the central axis 18.

As shown in FIG. 3, the vibration damping material 30 is provided as a thin uniformly thick layer over the second surface 54a. The vibration damping material 30 covers substantially the entire second surface 54a, such as at least 95% thereof, such as at least 99% thereof. In this specific example, a length of the vibration damping material 30 along the central axis 18 is longer than a length of the damping mass 32 along the central axis 18, here approximately twice as long.

The tool holder 12a of this example further comprises a front lock 58. The damping mass 32 is arranged between the front lock 58 and the fixed interior portion 50a.

The tool holder 12a of this example further comprises a front insulation element 60 and a rear insulation element 62. The front insulation element 60 and the rear insulation element 62 provide thermal protection, e.g. for dry machining. The front insulation element 60 is arranged between the front lock 58 and the front spring element 34. The front insulation element 60 is received in a recess in the front lock 58.

The rear insulation element 62 is arranged between the rear spring element 36 and the fixed interior portion 50a. The rear insulation element 62 is received in a recess in the fixed interior portion 50a. In this way, the damping mass 32 is connected to the fixed interior portion 50a via the rear spring element 36 and the rear insulation element 62. The provision of the front insulation element 60 and the rear insulation element 62 in respective recesses improves alignment with the central axis 18.

The front spring element 34 may be adhered to each of the front insulation element 60 and the damping mass 32. The rear spring element 36 may be adhered to each of the damping mass 32 and the rear insulation element 62.

The tool holder 12a of this example further comprises three O-rings 64, 66 and 68. The first O-ring 64 is received in a radially external groove in the front lock 58. The second O-ring 66 is received in a radially external groove in a rear region of the fixed interior portion 50a. The third O-ring 68 is received in a radially external groove in a rear region of the fixed tapered portion 52a.

The tool holder 12a of this example further comprises a fluid pipe 70. The fluid pipe 70 is in fluid communication with the bore 56. The fluid pipe 70 is connected to the fixed part 26a. In this specific example, the fluid pipe 70 is threaded into a front opening of the fixed interior portion 50a.

The vibration damping material 30 has a damping ratio of over 10%, such as over 30%. The vibration damping material 30 comprises acrylic resin in solid phase. Such acrylic resin behaves as an elastic solid when it is subjected to compression load and behaves as a high viscosity fluid when it is subjected to shear or tension load. At room temperature (20° C.), the acrylic resin may have a Young's modulus E of 0.15 MPa to 60 MPa, a shear modulus G of 0.05 MPa to 20 MPa, a bulk modulus K of 2.5 MPa to 1000 MPa and/or a Poisson's ratio υ of approximately 0.49.

The bulk modulus K can be defined as:

$$K = \frac{E}{3(1-2\upsilon)} \qquad (1)$$

or as:

$$K = \frac{2G(1+\upsilon)}{3(1-2\upsilon)} \qquad (2)$$

In this example, also the spring elements 34 and 36 are made of acrylic resin. Thus, the vibration damping material 30 and the spring elements 34 and 36 can be made of the same material.

As shown in FIG. 3, the tool holder 12a of this example is initially provided as a first unit 72a and a second unit 74a. The first unit 72a comprises the tubular element 20a and the end effector 16. The second unit 74a comprises the fixed part 26a, the mass damper assembly 28 and the vibration damping material 30. The second unit 74a further comprises the front lock 58, the O-rings 64, 66 and 68, the front insulation element 60, the rear insulation element 62 and the fluid pipe 70.

Figure 4:
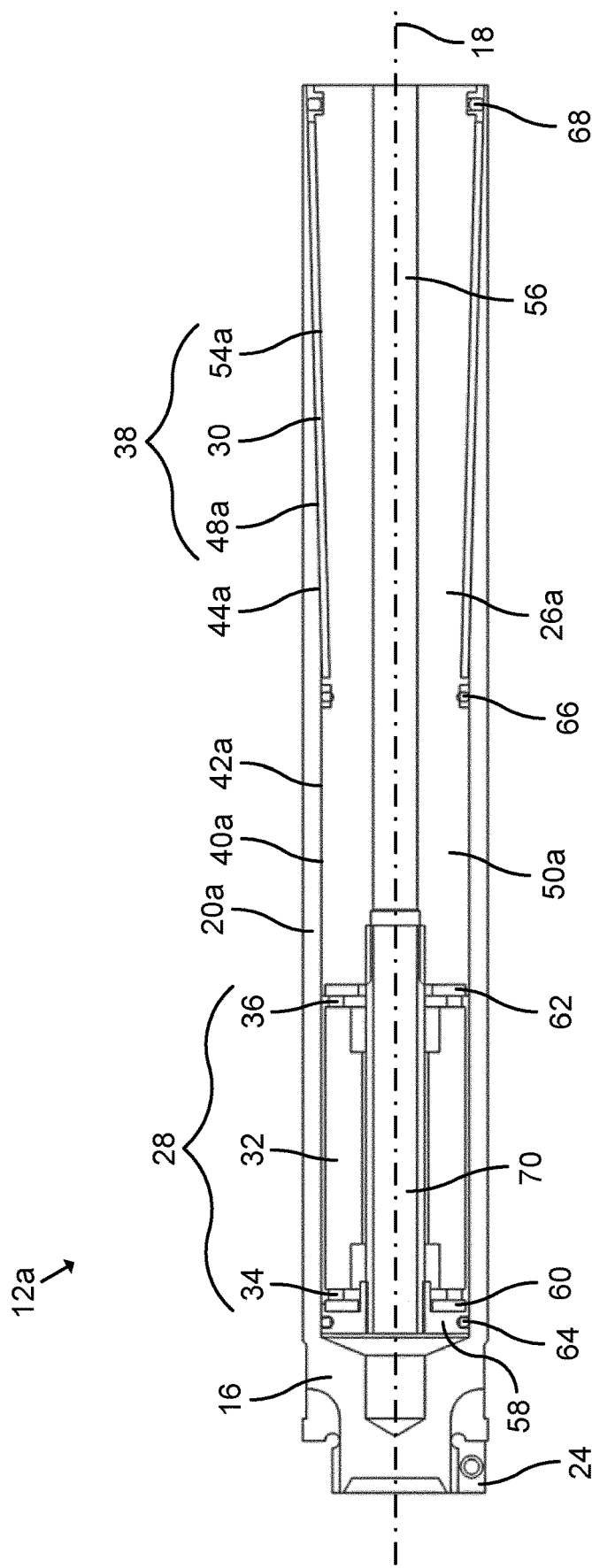
FIG. 4: schematically represents a cross-sectional side view of the damper device in FIGS. 2 and 3 in an assembled state.

FIG. 4 schematically represents a cross-sectional side view of the tool holder 12a in FIGS. 2 and 3 in an assembled state. The tool holder 12a of this example is assembled by inserting the fixed part 26a with the mass damper assembly 28 and the vibration damping material 30 into the cavity 40a. Due to the correspondingly tapered first surface 48a and second surface 54a and due to the compressibility of the vibration damping material 30, the first surface 48a and the second surface 54a become positioned relative to each other such that the vibration damping material 30 is evenly compressed therebetween as the fixed part 26a enters the cavity 40a. The vibration damping material 30 may for example be compressed 10% from its original thickness (in FIG. 3). The compression of the vibration damping material 30 will assist the fixed part 26a to be centered with respect to the central axis 18, for example with an accuracy of 0.01 mm.

By sliding the fixed part 26a into the cavity 40a along the central axis 18 in this way, a uniform precompression will be applied to the vibration damping material 30 without distorting, smearing and damaging the vibration damping material 30. In this specific example, the vibration damping material 30 is provided between the first surface 48a and the second surface 54a such that the first surface 48a is not in contact with the second surface 54a.

The vibration damping material 30 may also be slightly sheared when moving the fixed part 26a to compress the vibration damping material 30. However, compression is the dominant stress of the vibration damping material 30 during assembly.

The tapered designs of the first surface 48a and the second surface 54a provide a high degree of compression during assembly. The compression of the vibration damping material 30 provides a self-locking effect such that the first surface 48a and the second surface 54a are not separated from each other.

The fixed interior portion 50a is fitted to the cylindrical cavity portion 42a with a transition fit. In this way, the bending area of moment can be maintained when the fixed interior portion 50a is inserted into the cavity 40a despite introducing the structure damper assembly 38. The introduction of the structure damper assembly 38 thereby has a minimum impact on the static stiffness of the tool holder 12a when the tool holder 12a is clamped in a tool fixture.

As the fixed part 26 is inserted into the cavity 40a, the mass damper assembly 28, connected to the fixed part 26a, enters the cylindrical cavity portion 42a in front of the fixed part 26a. The fixed part 26a is fixed to the back end 22 either before or after assembly of the tool holder 12a.

As shown in FIG. 4, the structure damper assembly 38 of this example also comprises the first surface 48a and the second surface 54a. The damping mass 32 is arranged inside the cylindrical cavity portion 42a and is movable radially with respect to the central axis 18 and relative to the tubular element 20a. The spring elements 34 and 36 support the damping mass 32 relative to the tubular element 20a. The O-rings 64, 66 and 68 provide a sealing of the cavity 40a and protect the mass damper assembly 28 and the structure damper assembly 38 from oil and dust in the machining environment.

During machining with the machine tool 10a, cutting forces are applied to the cutting teeth 14 and vibrations occur in all components of the machine tool 10a. Vibration waves carrying energy will travel back and forth in the tool holder 12a. The vibration energy will alternate between kinetic vibration energy and potential vibration energy. Kinetic vibration energy from vibrations in the tool holder 12a is transferred to the damping mass 32 via the spring elements 34 and 36 where it is attenuated and reflected.

The vibration damping material 30 functions as a spring. The vibration damping material 30 attenuates potential vibration energy, regardless of the vibration frequency of the tool holder 12a. The vibration damping material 30 can thus attenuate vibrations also at frequencies outside a nominal range for the mass damper assembly 28. The vibration damping material 30 may be sheared and/or further compressed to absorb vibrational energy in this way. A portion of the vibration wave will also be reflected by and/or transmitted through the vibration damping material 30. Vibration waves having frequencies close to the prominent frequency of the tool holder 12a will be reflected to a larger extent. The prominent frequency of the tool holder 12a is decided by its structure, for example by its length to diameter ratio.

The mass damper assembly 28 and the structure damper assembly 38 work simultaneously and independently, to attenuate the vibrations during the machining operation. The structure damper assembly 38 and the mass damper assembly 28 thus cooperate to efficiently attenuate machining vibrations. As a consequence, the surface finish provided by the machine tool 10a is improved and the lifetime is increased. The introduction of the structure damper assembly 38 has a minimum impact on rigidity of the tool holder 12a, a runout of the cutting teeth 14 and weight balancing of the tool holder 12a.

In case the vibration damping material 30 would not be provided and there would instead be an interference fit between the first surface 48a and the second surface 54a, there would be a very low damping ratio between the tubular element 20a and the fixed part 26a, for example less than 1%. By means of the vibration damping material 30 however, the damping ratio between the tubular element 20a and the fixed part 26a can be substantially higher, such as 10% or higher. In this way, the vibration damping material 30 can attenuate potential vibration energy more efficiently.

In this example, the tubular element 20a has an external diameter of 25 mm and the vibration damping material 30 has a thickness of 0.1 mm. The tool holder 12a thereby only has a reduced static stiffness of 0.1% as compared with a corresponding tool holder with an interference fit between the first surface 48a and the second surface 54a. However, due to the vibration damping material 30, the dynamic stiffness of the tool holder 12a is increased with 100% compared with such corresponding tool holder. The substantially increased dynamic stiffness enables the tool holder 12a to more efficiently dampen vibrations by means of the damping mass 32.

Figure 5:
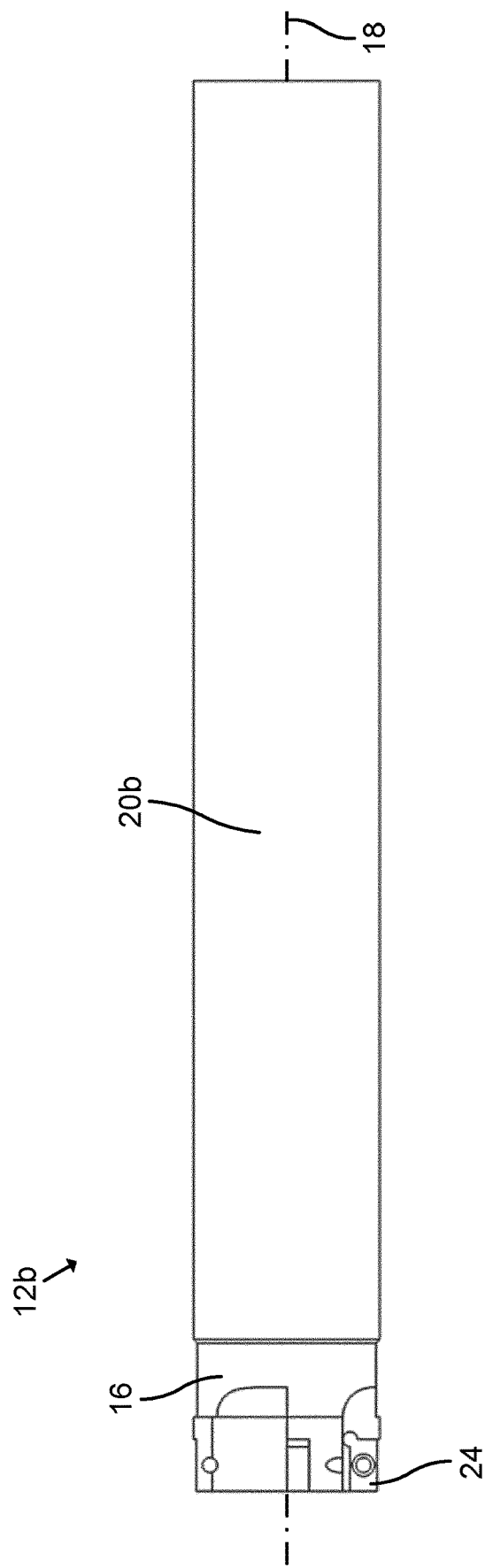
FIG. 5: schematically represents a side view of a further example of a damper device.

FIG. 5 schematically represents a side view of a further example of a tool holder 12b. The tool holder 12b is a further example of a damper device according to the present disclosure. Mainly differences with respect to the tool holder 12a will be described. The tool holder 12b comprises a tubular element 20b.

Figure 6:
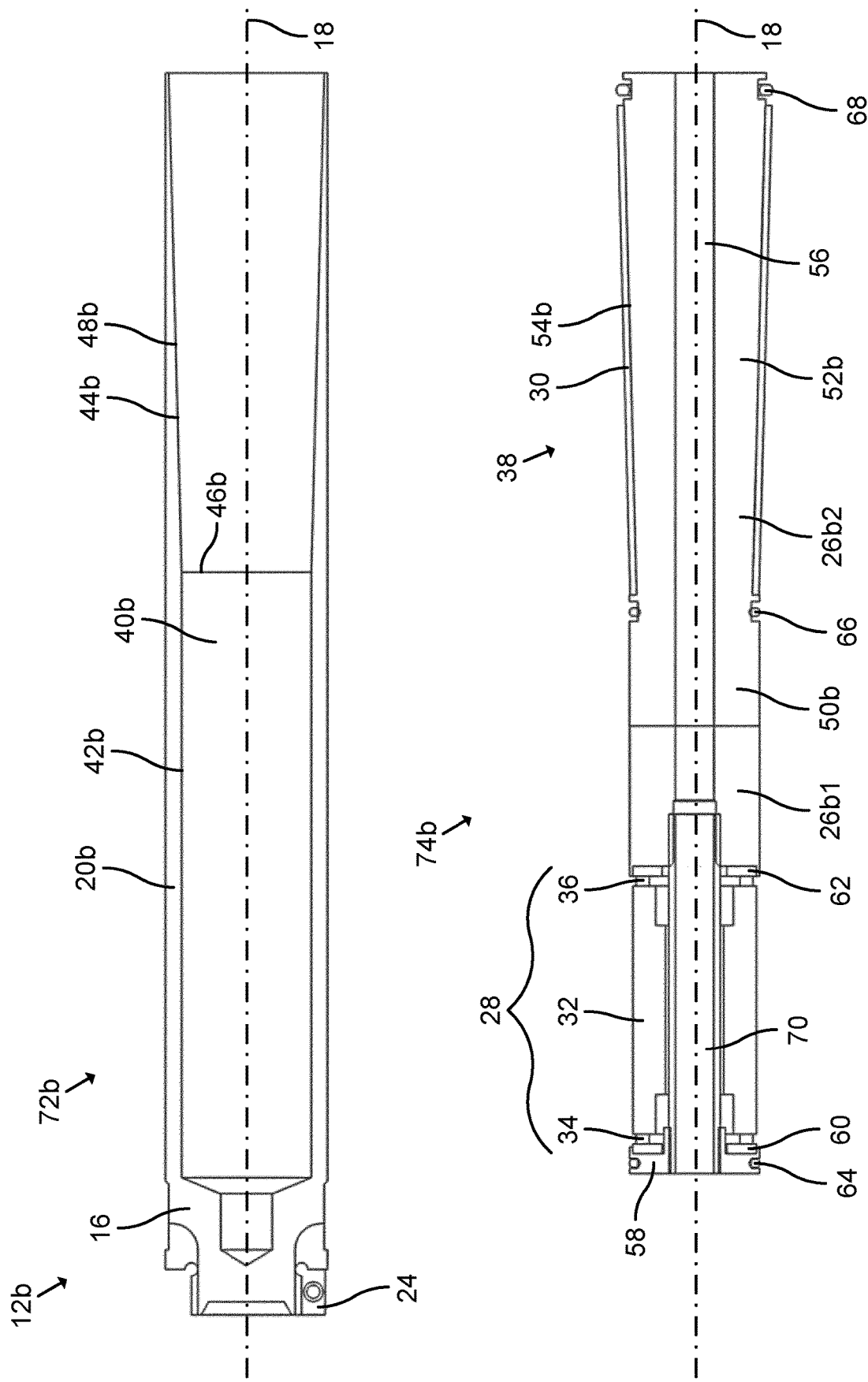
FIG. 6: schematically represents a cross-sectional side view of the damper device in FIG. 5 in an unassembled state.

FIG. 6 schematically represents a cross-sectional side view of the tool holder 12b in FIG. 5 in an unassembled state. As shown in FIG. 6, the tubular element 20b is identical to the tubular element 20a. The tubular element 20b comprises a cavity 40b, a cylindrical cavity portion 42b, a tapered cavity portion 44b defining a first surface 48b, and an edge 46b between the cylindrical cavity portion 42b and the tapered cavity portion 44b.

Instead of the fixed part 26a, the tool holder 12b comprises a first fixed part 26b1 and a second fixed part 26b2. The first fixed part 26b1 is connected to the second fixed part 26b2 at a front of the second fixed part 26b2. The first fixed part 26b1 and a front of the second fixed part 26b2 form a fixed interior portion 50b. The fixed interior portion Sob is of the same size and function as the fixed interior portion 50a.

The second fixed part 26b2 comprises a fixed tapered portion 52b having a second surface 54b. The fixed tapered portion 52b and the second surface 54b are of the same design as the fixed tapered portion 52a and the second surface 54a, respectively.

Figure 7:
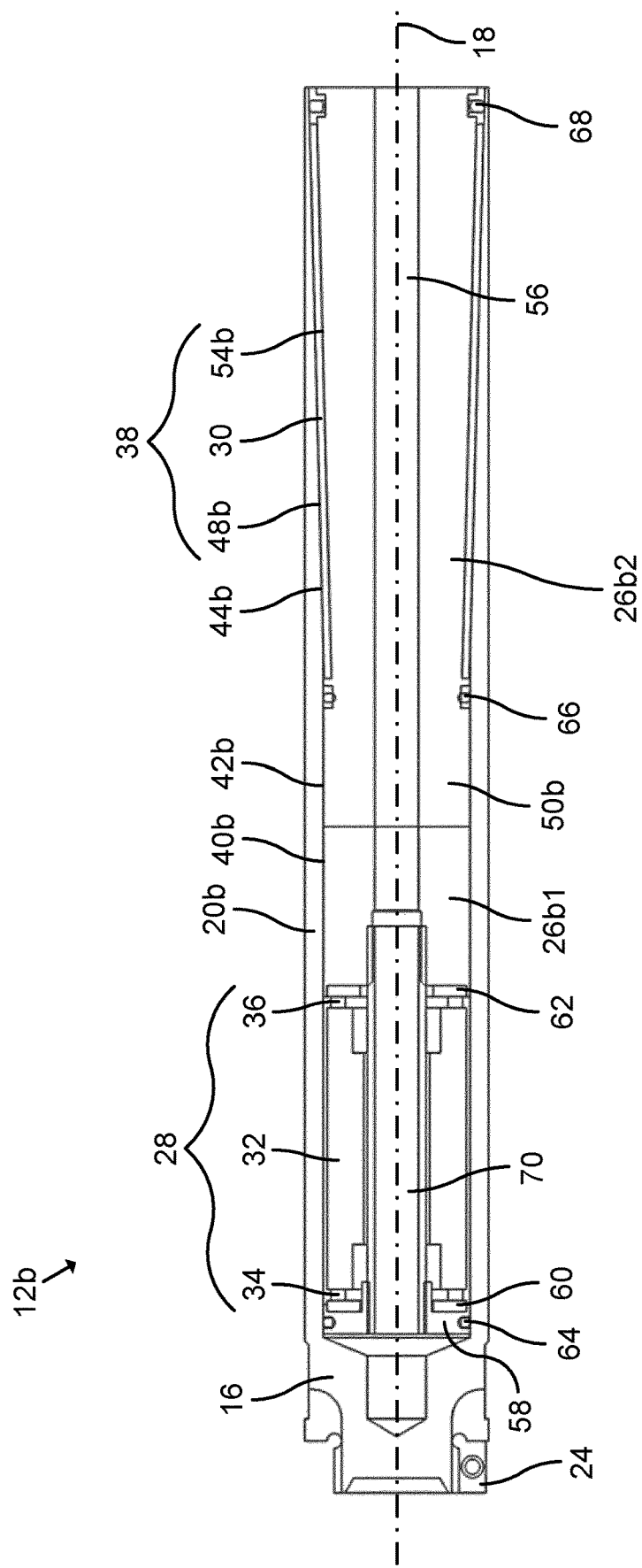
FIG. 7: schematically represents a cross-sectional side view of the damper device in FIGS. 5 and 6 in an assembled state.

FIG. 7 schematically represents a cross-sectional side view of the tool holder 12b in FIGS. 5 and 6 in an assembled state. Similarly to FIG. 4, the tool holder 12b is assembled by inserting the second unit 74b into the first unit 72b to compress the vibration damping material 30 between the first surface 48b and the second surface 54b.

Figure 8:
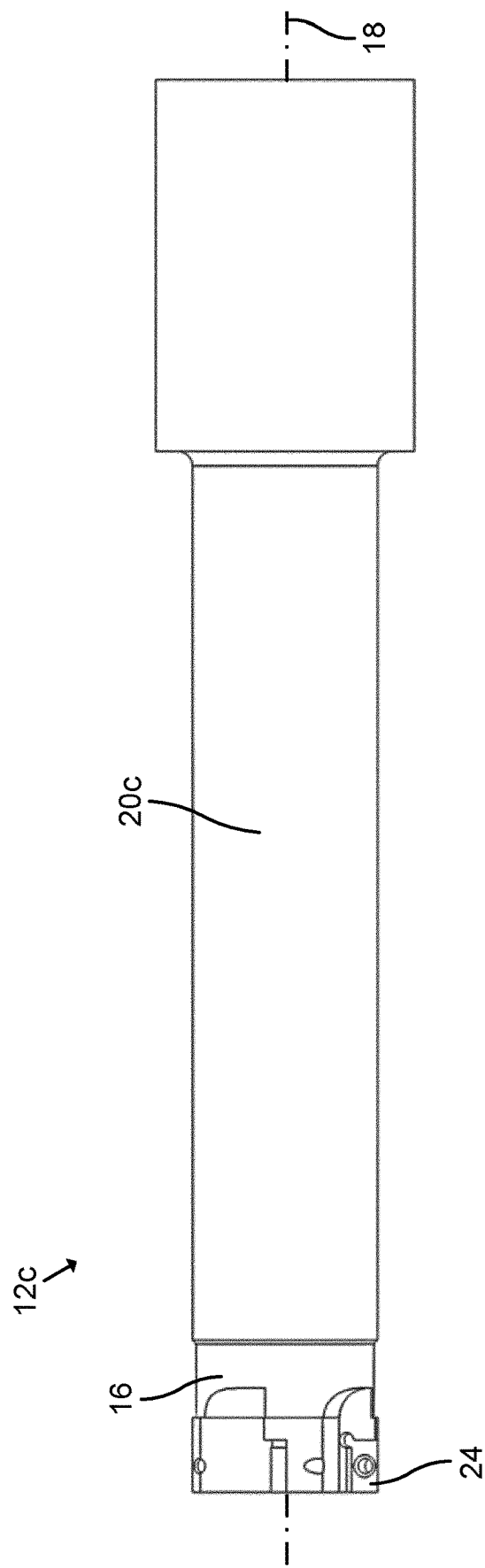
FIG. 8: schematically represents a side view of a further example of a damper device.

FIG. 8 schematically represents a side view of a further example of a tool holder 12c. The tool holder 12c is a further example of a damper device according to the present disclosure. Mainly differences with respect to the tool holder 12a will be described. The tool holder 12c comprises a tubular element 20c.

Figure 9:
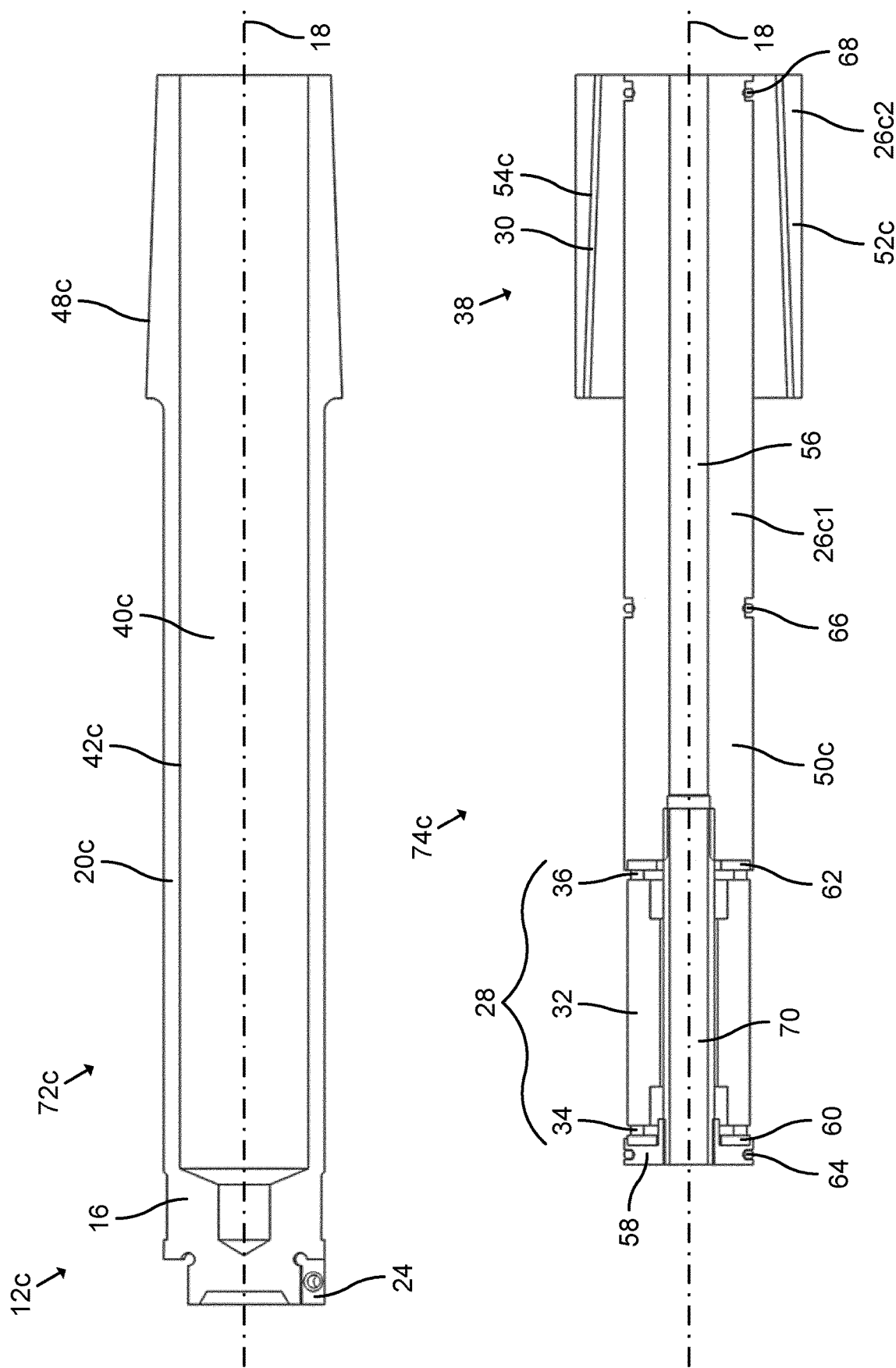
FIG. 9: schematically represents a cross-sectional side view of the damper device in FIG. 8 in an unassembled state.

FIG. 9 schematically represents a cross-sectional side view of the tool holder 12c in FIG. 8 in an unassembled state. The tubular element 20c comprises a cavity 40c having only a cylindrical cavity portion 42c. The tubular element 20c comprises a tapered first surface 48c at its rear end. The first surface 48c is an exterior surface of the tubular element 20c. The first surface 48c is conical and has a larger diameter at its front end than at its rear end.

The tool holder 12c further comprises a first fixed part 26c1 and a second fixed part 26c2. The first fixed part 26c1 and second fixed part 26c2 are not directly connected to each other. However, the first fixed part 26c1 and the second fixed part 26c2 are fixed with respect to each other when the tool holder 12c is assembled, e.g. by fixation to the back end 22. The second fixed part 26c2 surrounds a rear portion of the first fixed part 26c1.

The first fixed part 26c1 is entirely cylindrical (except for the grooves for the second O-ring 66 and the third O-ring 68). The first fixed part 26c1 comprises a fixed interior portion 50c with a circular cross-section.

The second fixed part 26c2 is generally cylindrical. The second fixed part 26c2 comprises a fixed tapered portion 52c defining a tapered second surface 54c. The second surface 54c has a larger internal diameter at a front end than at a rear end. The vibration damping material 30 is provided on the second surface 54c.

Figure 10:
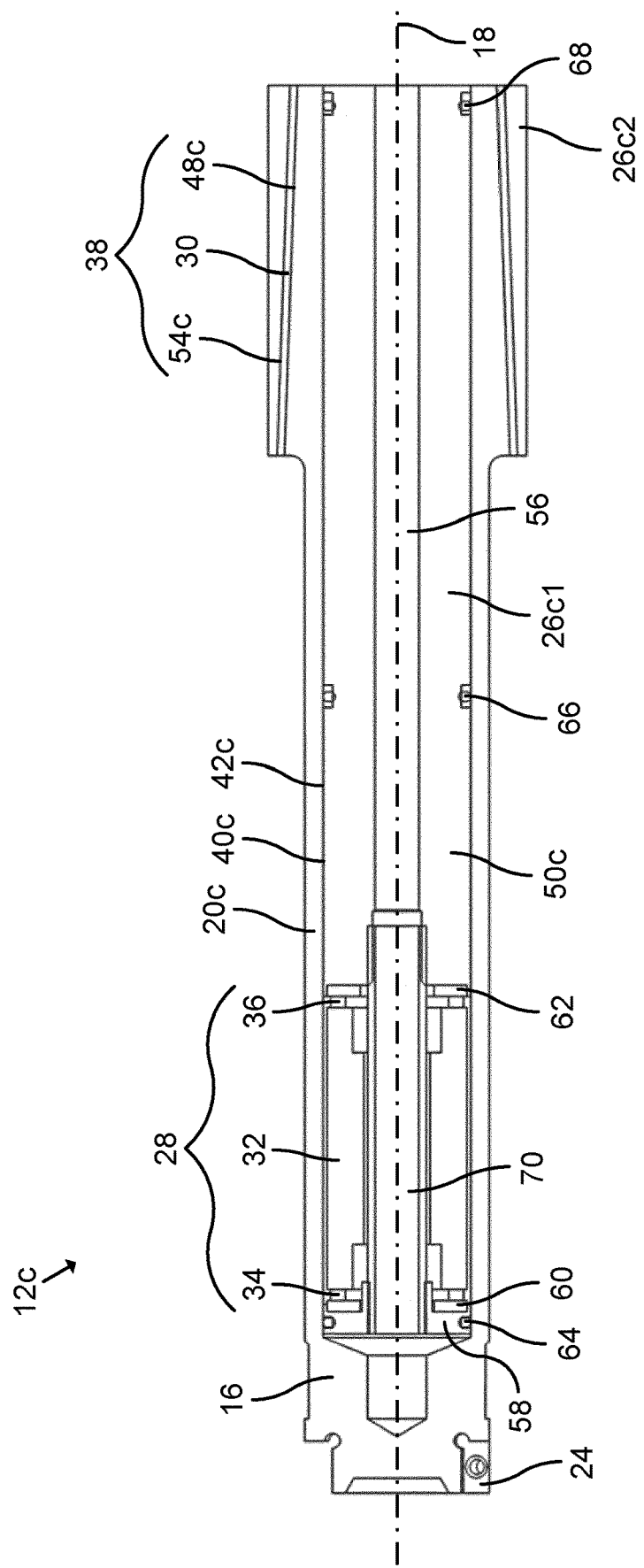
FIG. 10: schematically represents a cross-sectional side view of the damper device in FIGS. 8 and 9 in an assembled state.

FIG. 10 schematically represents a cross-sectional side view of the tool holder 12c in FIGS. 8 and 9 in an assembled state. The tool holder 12c can be assembled by fixing the first fixed part 26c1 and the second fixed part 26c2 of the second unit 74c to each other (e.g. by connection to the back end 22) and moving the first unit 72c rearwardly along the central axis 18 into the space between the first fixed part 26c1 and the second fixed part 26c2. Similarly to the tool holders 12a and 12b, the relative movement between the first surface 48c and the second surface 54c along the central axis 18 will cause an even compression of the vibration damping material 30 therebetween. However, in the tool holder 12c, the second surface 54c surrounds the tubular element 20c.

Figure 11:
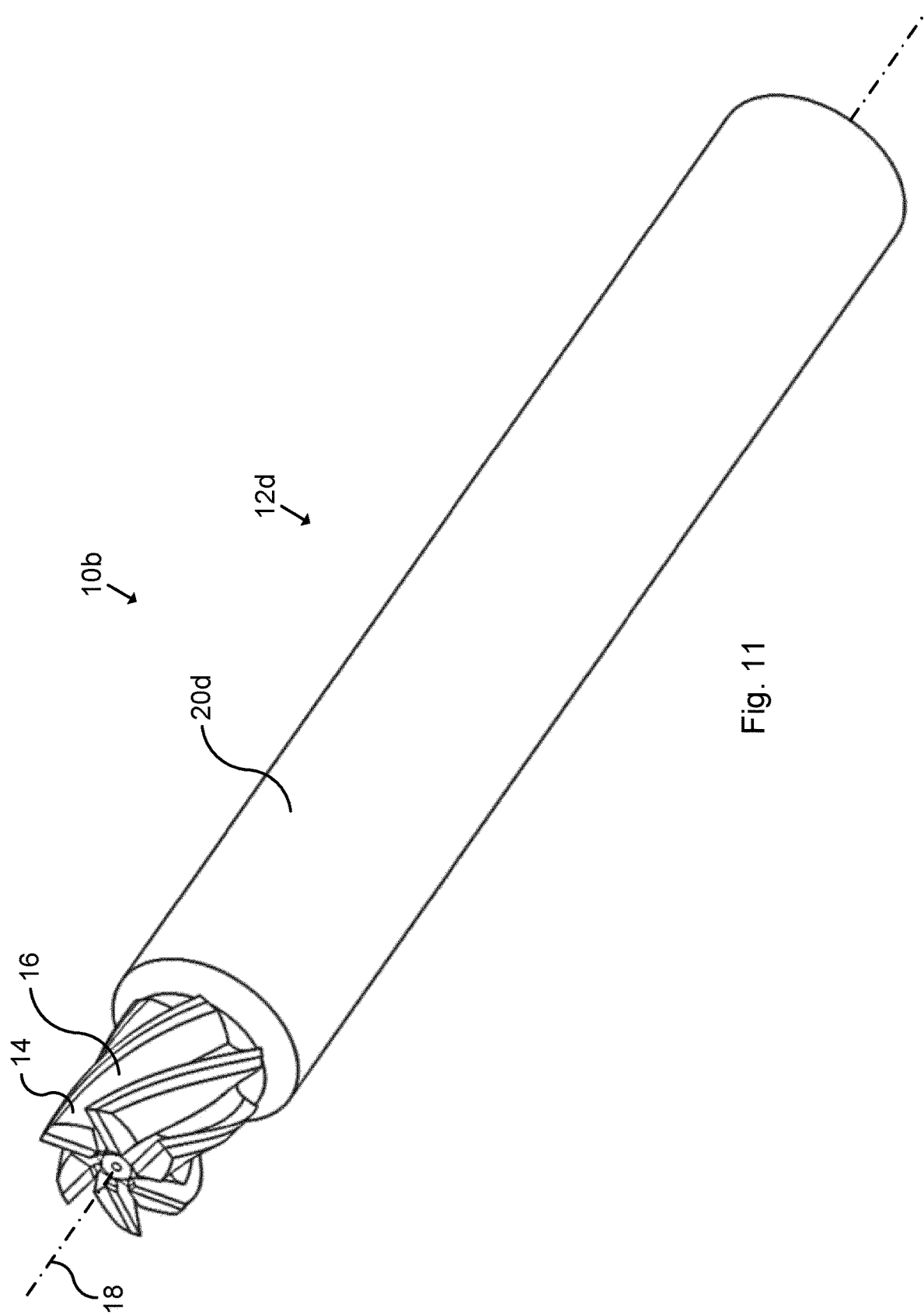
FIG. 11: schematically represents a perspective side view of a further example of a machine tool comprising a further example of a damper device.

FIG. 11 schematically represents a perspective side view of a further example of a machine tool 10b comprising a tool 12d. The tool 12d is a further example of a damper device according to the present disclosure. The tool 12d of this example comprises a tubular element 20d and an end effector 16 integrally formed with the tubular element 20d. The end effector 16 comprises a plurality of cutting teeth 14, here six helical cutting teeth 14.

Figure 12:
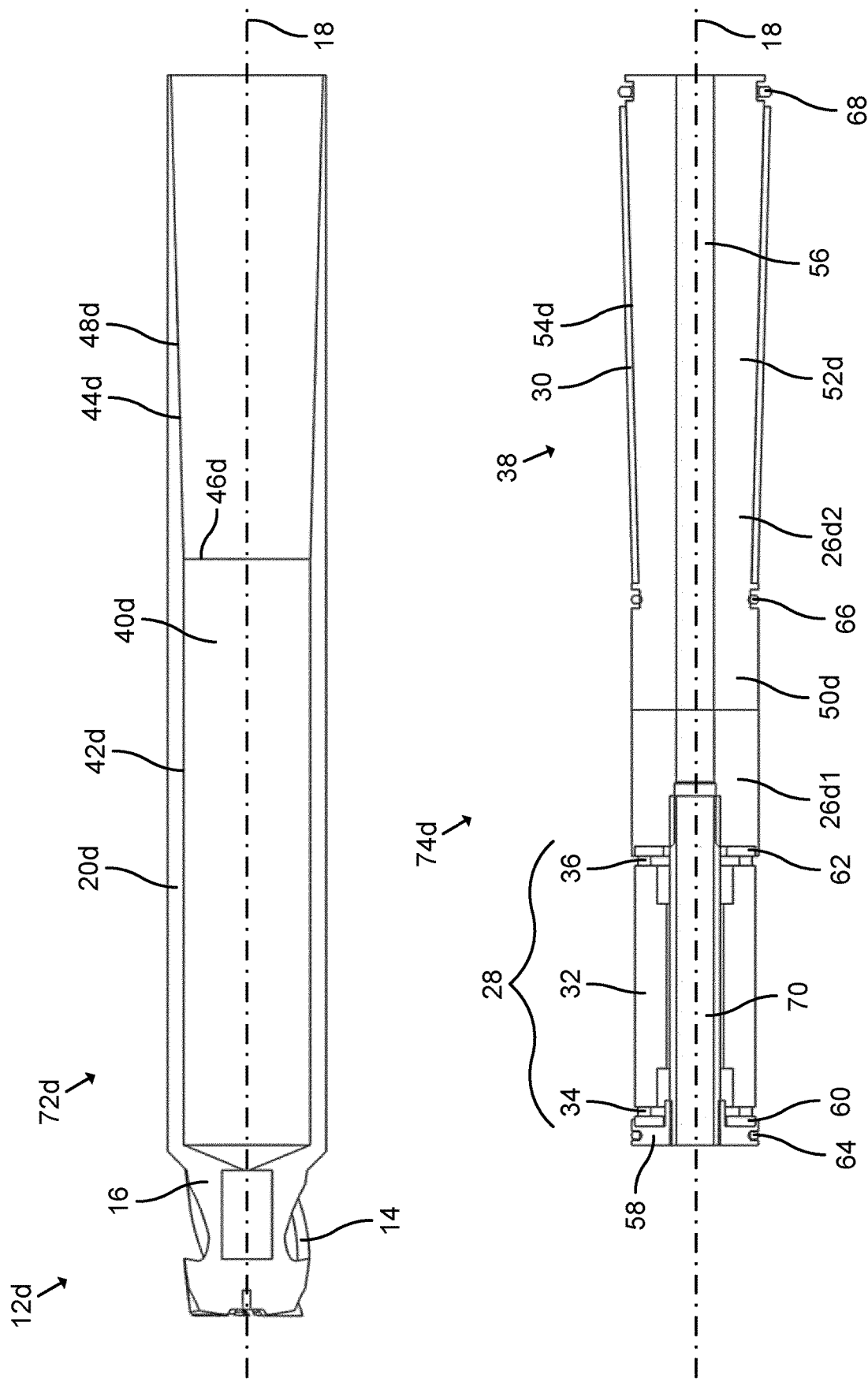
FIG. 12: schematically represents a cross-sectional side view of the damper device in FIG. 11 in an unassembled state.

FIG. 12 schematically represents a cross-sectional side view of the tool 12d in FIG. 11 in an unassembled state. Except for the end effector 16, the tubular element 20d is identical to the tubular element 20a. The tubular element 20d comprises a cavity 40d, a cylindrical cavity portion 42d, a tapered cavity portion 44d defining a first surface 48d, and an edge 46d between the cylindrical cavity portion 42d and the tapered cavity portion 44d.

Similarly to the tool holder 12b, the tool 12d comprises a first fixed part 26d1 and a second fixed part 26d2. The first fixed part 26d1 is connected to the second fixed part 26d2 at a front of the second fixed part 26d2. The first fixed part 26d1 and a front of the second fixed part 26d2 form a fixed interior portion Sod. The fixed interior portion Sod is of the same size and function as the fixed interior portion 50b.

The second fixed part 26d2 comprises a fixed tapered portion 52d having a second surface 54d. The fixed tapered portion 52d and the second surface 54d are of the same design as the fixed tapered portion 52b and the second surface 54b, respectively.

Figure 13:
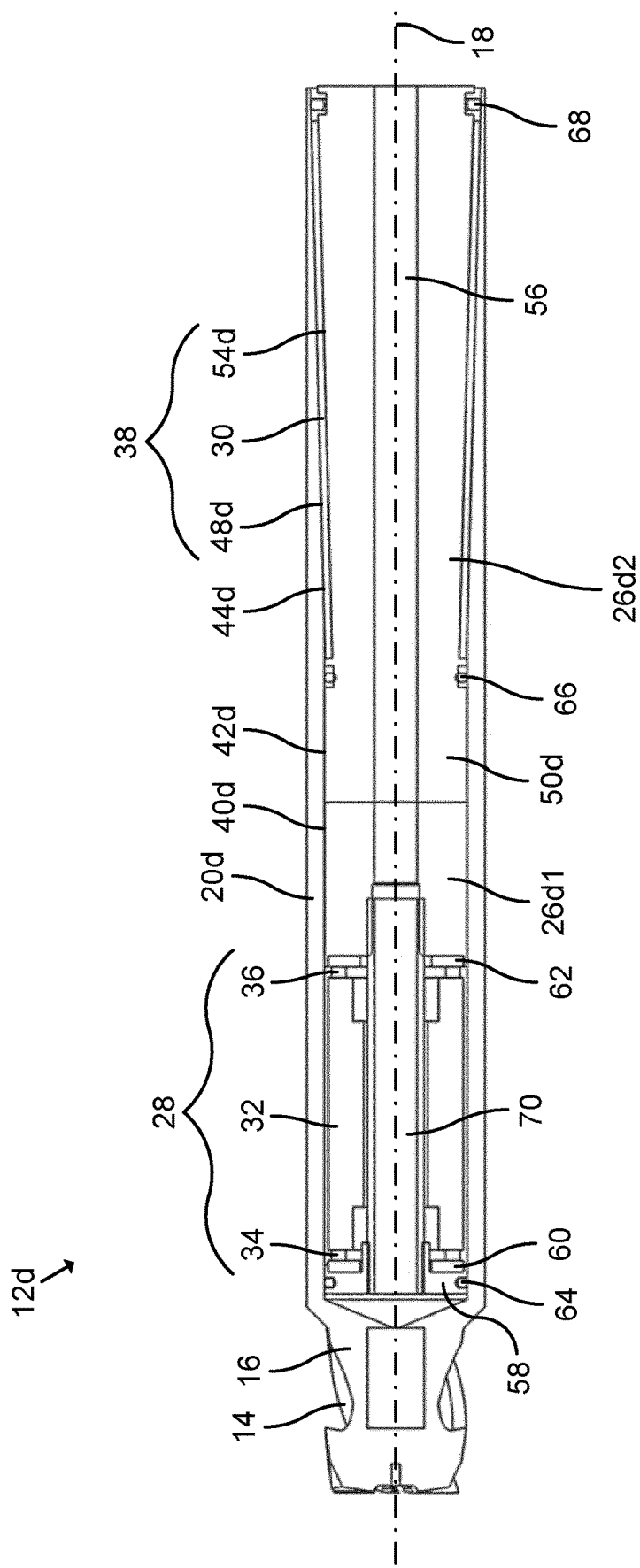
FIG. 13: schematically represents a cross-sectional side view of the damper device in FIGS. 11 and 12 in an assembled state.

FIG. 13 schematically represents a cross-sectional side view of the tool 12d in FIGS. 11 and 12 in an assembled state. Similarly to the tool holder 12b in FIG. 7, the tool 12d is assembled by inserting the second unit 74d into the first unit 72d to compress the vibration damping material 30 between the first surface 48d and the second surface 54d.

Figure 14:
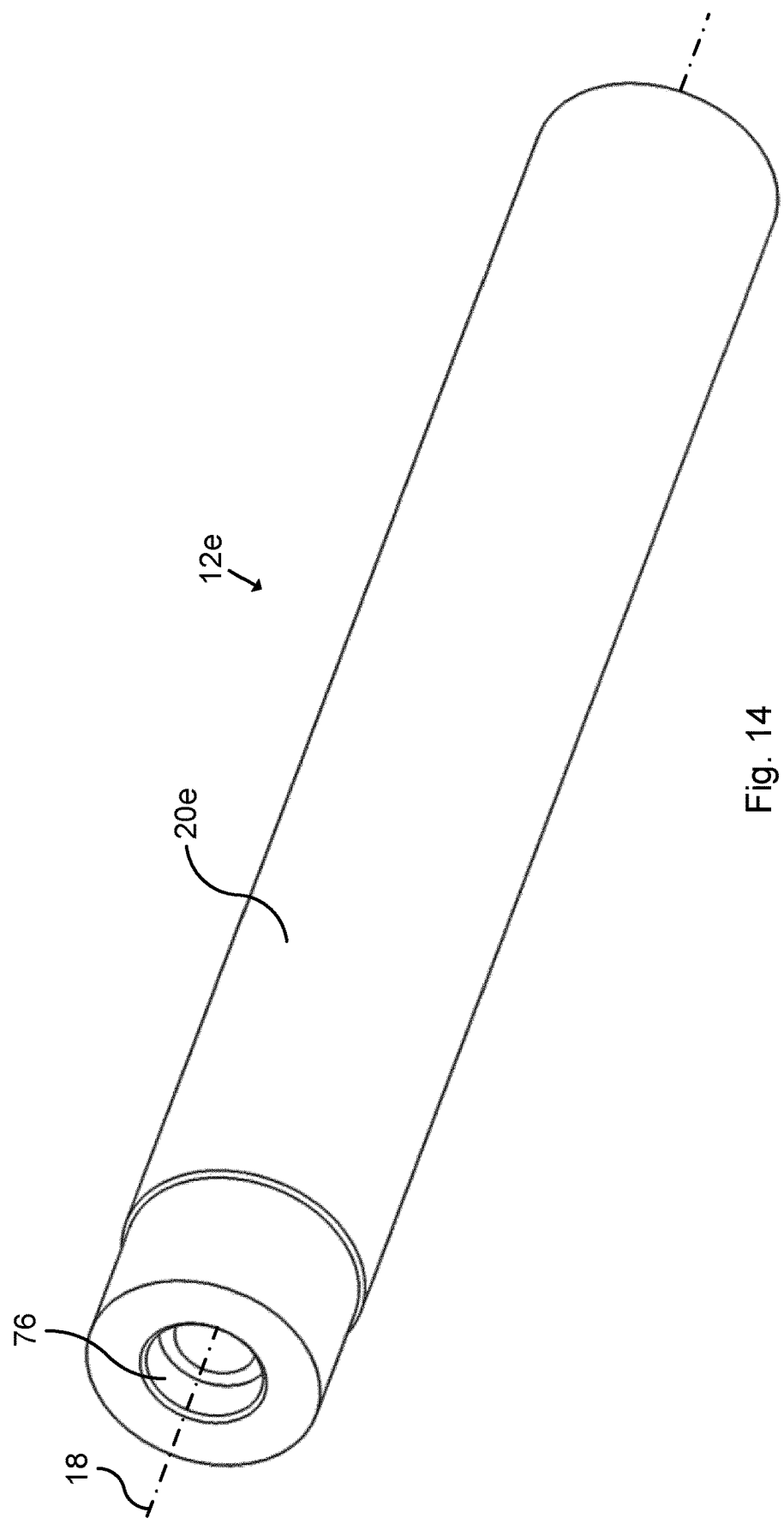
FIG. 14: schematically represents a perspective side view of a further example of a damper device.

FIG. 14 schematically represents a perspective side view of a further example of a tool holder 12e. The tool holder 12e is a further example of a damper device according to the present disclosure. The tool holder 12e of this example comprises a tubular element 20e and a mounting interface 76 for mounting a cutter head (not shown). The mounting interface 76 of this specific example comprises a thread and is integrally formed with the tubular element 20e.

Figure 15:
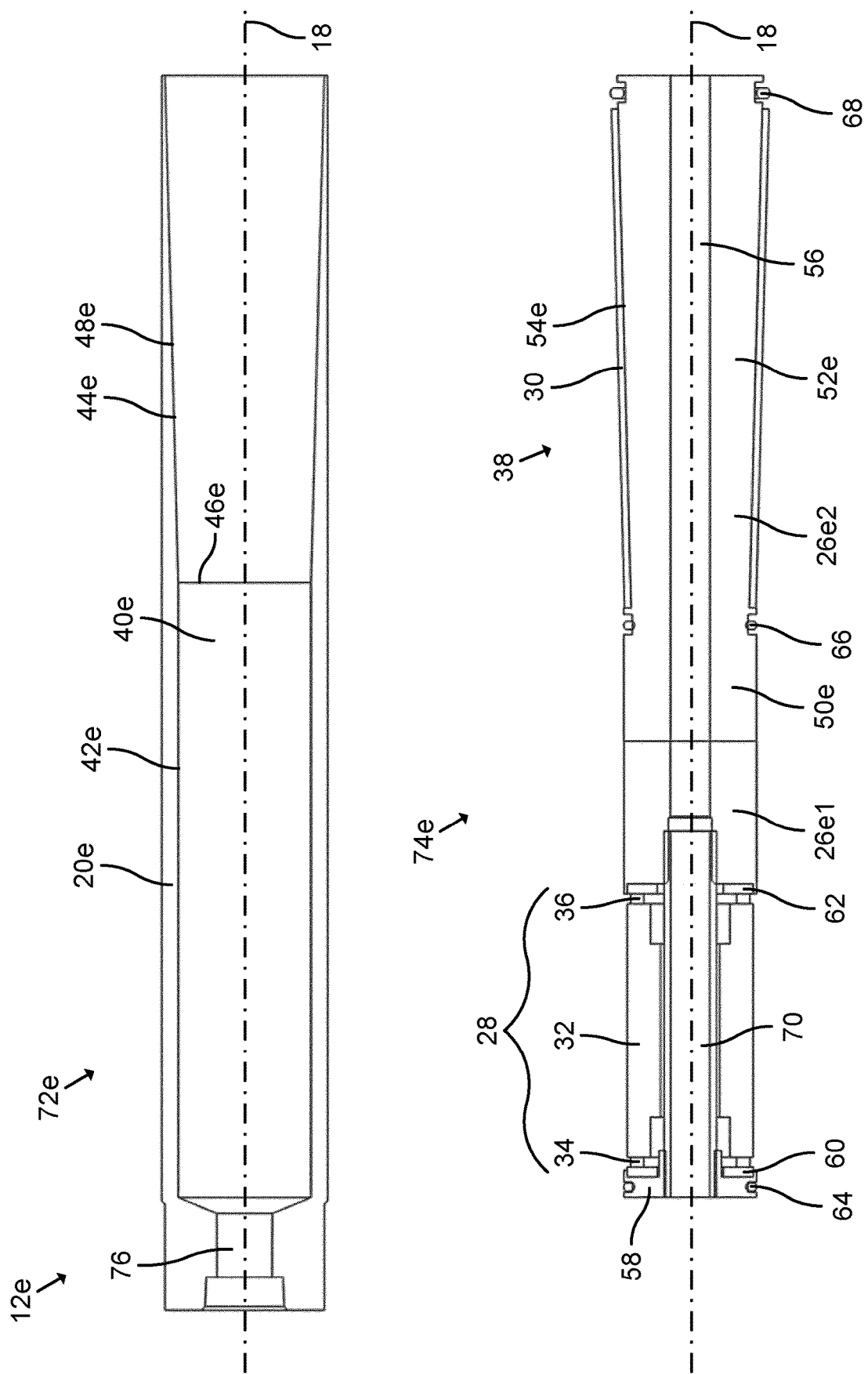
FIG. 15: schematically represents a cross-sectional side view of the damper device in FIG. 14 in an unassembled state.

FIG. 15 schematically represents a cross-sectional side view of the tool holder 12e in FIG. 14 in an unassembled state. Except for the mounting interface 76, the tubular element 20e is identical to the tubular element 20a. The tubular element 20e comprises a cavity 40e, a cylindrical cavity portion 42e, a tapered cavity portion 44e defining a first surface 48e, and an edge 46e between the cylindrical cavity portion 42e and the tapered cavity portion 44e.

Similarly to the tool holder 12b, the tool holder 12e comprises a first fixed part 26e1 and a second fixed part 26e2. The first fixed part 26e1 is connected to the second fixed part 26e2 at a front of the second fixed part 26e2. The first fixed part 26e1 and a front of the second fixed part 26e2 form a fixed interior portion 50e. The fixed interior portion 50e is of the same size and function as the fixed interior portion 50b.

The second fixed part 26e2 comprises a fixed tapered portion 52e having a second surface 54e. The fixed tapered portion 52e and the second surface 54e are of the same design as the fixed tapered portion 52b and the second surface 54b, respectively.

Figure 16:
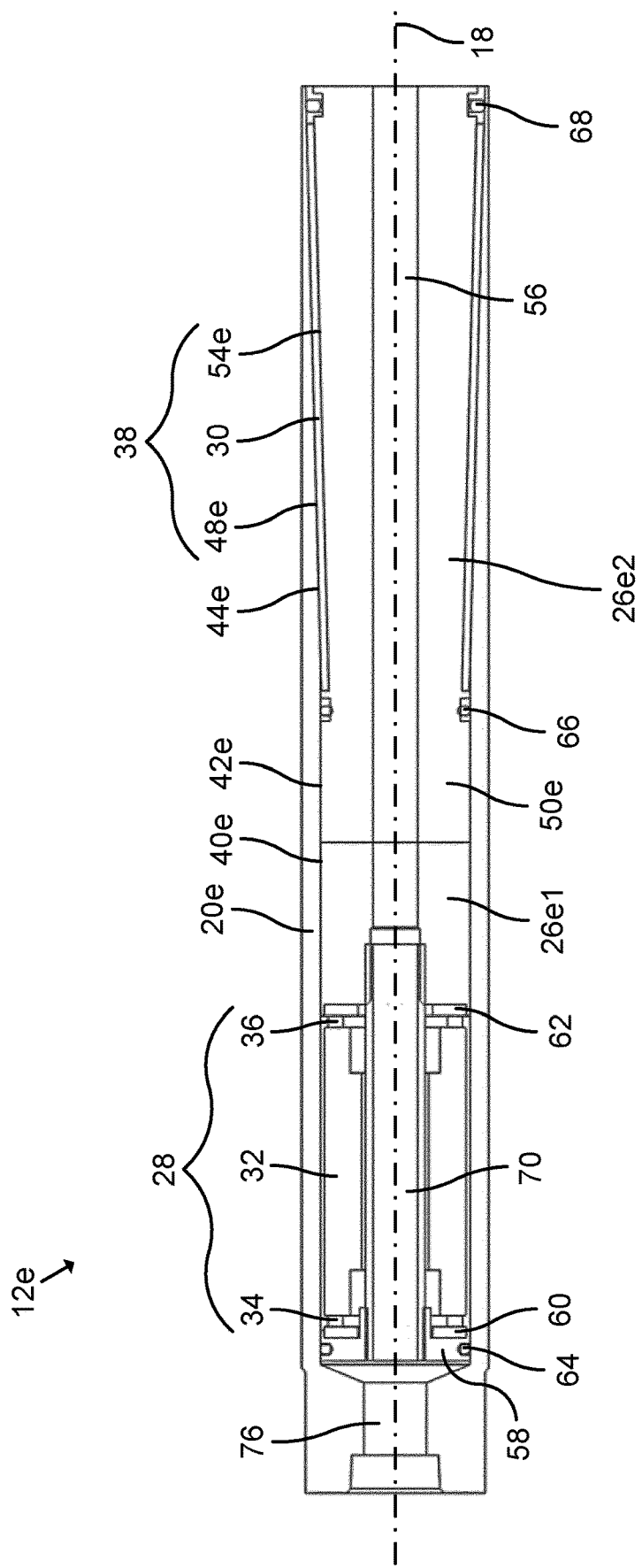
FIG. 16: schematically represents a cross-sectional side view of the damper device in FIG. 15 in an assembled state.

FIG. 16 schematically represents a cross-sectional side view of the tool holder 12e in FIG. 15 in an assembled state. Similarly to FIG. 7, the tool holder 12e is assembled by inserting the second unit 74e into the first unit 72e to compress the vibration damping material 30 between the first surface 48e and the second surface 54e.

One or both of the machine tools 10a and 10b may alternatively be referred to with reference numeral "10". One, several or all of the tool holders 12, 12a-12c and the 12e, and the tool 12d, may alternatively be referred to with reference numeral "12". One, several or all of the tubular elements 20a-20e may alternatively be referred to with reference numeral "20". One, several or all of the fixed parts 26a-26e may alternatively be referred to with reference numeral "26". One, several or all of the cavities 40a-40e may alternatively be referred to with reference numeral "40". One, several or all of the cylindrical cavity portions 42a-42e may alternatively be referred to with reference numeral "42". One, several or all of the tapered cavity portions 44a, 44b, 44d and 44e may alternatively be referred to with reference numeral "44". One, several or all of the first surfaces 48a-48e may alternatively be referred to with reference numeral "48". One, several or all of the fixed interior portions 50a-50e may alternatively be referred to with reference numeral "50". One, several or all of the second surfaces 54a-54e may alternatively be referred to with reference numeral "54".

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A damper device for a machine tool, the damper device comprising:
    a tubular element having a cavity and a central axis, the tubular element comprising a first surface;
    a damping mass arranged within the cavity and movable radially with respect to the central axis and relative to the tubular element;
    at least one spring element supporting the damping mass relative to the tubular element, the damping mass and the at least one spring element being arranged to attenuate kinetic vibration energy of the damper device;
    at least one fixed part having a fixed interior portion inside the cavity and a second surface, the fixed interior portion being fitted into the cavity by a transition fit or an interference fit; and
    a vibration damping material provided between the first surface and the second surface, the vibration damping material being arranged to attenuate potential vibration energy of the damper device;
    wherein the vibration damping material is substantially evenly compressed between the first surface and the second surface.

2. The damper device according to claim 1, wherein the first surface and the second surface are tapered.

3. The damper device according to claim 2, wherein the first surface and/or the second surface has an average inclination of at least 0.2 degrees with respect to the central axis.

4. The damper device according to claim 2, wherein the at least one fixed part is assembled by relative movement between the tubular element and the at least one fixed part along the central axis such that the vibration damping material is substantially evenly compressed between the first surface and the second surface.

5. The damper device according to claim 1, wherein the vibration damping material comprises a viscoelastic material.

6. The damper device according to claim 1, wherein the cavity comprises a cylindrical cavity portion, wherein the damping mass is arranged within the cylindrical cavity portion, and wherein at least a portion of one or more of the at least one fixed part is arranged within the cylindrical cavity portion.

7. The damper device according to claim 1, wherein the cavity comprises a tapered cavity portion defining the first surface.

8. The damper device according to claim 1, wherein the at least one fixed part comprises at least two fixed parts fixed with respect to each other.

9. The damper device according to claim 1, wherein the fixed interior portion comprises a fixed cylindrical portion.

10. The damper device according to claim 1, wherein one or more of the at least one spring element is connected to the fixed interior portion.

11. The damper device according to claim 1, wherein the second surface is inserted into the cavity.

12. The damper device according to claim 1, wherein the at least one fixed part comprises a mandrel.

13. The damper device according to claim 1, wherein the vibration damping material has a damping ratio of at least 10%.

14. The damper device according to claim 1, wherein the first surface and the second surface are conical.

15. The damper device according to claim 1, wherein the first surface and the second surface are parallel.

16. The damper device according to claim 1, wherein the vibration damping material has a thickness of less than 1 mm.

17. The damper device according to claim 1, wherein the vibration damping material has a Poisson's ratio of at least 0.35.

18. A machine tool comprising a damper device according to claim 1.

19. A method of assembling a damper device for a machine tool, the method comprising:
    providing a tubular element having a cavity and a central axis, the tubular element comprising a first surface;
    providing a damping mass arranged within the cavity and movable radially with respect to the central axis and relative to the tubular element;
    providing at least one spring element supporting the damping mass relative to the tubular element, the damping mass and the at least one spring element being arranged to attenuate kinetic vibration energy of the damper device;
    providing at least one fixed part having a fixed interior portion inside the cavity and a second surface, the fixed interior portion being fitted into the cavity by a transition fit or an interference fit;
    providing a vibration damping material between the first surface and the second surface, the vibration damping material being arranged to attenuate potential vibration energy of the damper device; and
    positioning the first surface and the second surface relative to each other such that the vibration damping material is substantially evenly compressed between the first surface and the second surface.

20. The method according to claim 19, wherein the first surface and the second surface are tapered, and wherein the method further comprises moving the tubular element and the at least one fixed part relative to each other along the central axis such that the vibration damping material is substantially evenly compressed between the first surface and the second surface.

21. A damper device assembled according to the method of claim 19.

22. A machine tool comprising a damper device according to claim 21.

* * * * *